United States Patent [19]
Orton et al.

US005250608A

[11] Patent Number: 5,250,608
[45] Date of Patent: Oct. 5, 1993

[54] CURABLE COMPOSITIONS

[75] Inventors: Michael L. Orton, Hartford; Susanne H. Rogers, Blumdellsands; Ian M. Fraser, Yarm, all of England

[73] Assignee: Imperial Chemical Industries plc, London, England

[21] Appl. No.: 923,420

[22] Filed: Aug. 3, 1992

[30] Foreign Application Priority Data

Aug. 2, 1991 [GB] United Kingdom ............... 9116781

[51] Int. Cl.$^5$ .............................................. C08L 39/04
[52] U.S. Cl. ................... 524/548; 526/261; 525/278; 525/281
[58] Field of Search ............... 525/278, 281; 526/261; 524/548

[56] References Cited

U.S. PATENT DOCUMENTS

| | | | |
|---|---|---|---|
| 4,145,544 | 3/1979 | Kuehn | 544/222 |
| 4,195,146 | 3/1980 | Markiewitz et al. | 526/261 |
| 4,870,152 | 9/1989 | Meixner et al. | 528/49 |

FOREIGN PATENT DOCUMENTS

| | | |
|---|---|---|
| 1227203 | 9/1987 | Canada . |
| 0000659 | 2/1979 | European Pat. Off. . |
| 0118725 | 9/1984 | European Pat. Off. . |
| 0315020 | 5/1989 | European Pat. Off. . |

Primary Examiner—Joseph L. Schofer
Assistant Examiner—Mark Nagumo
Attorney, Agent, or Firm—Cushman, Darby & Cushman

[57] ABSTRACT

A polymerizable composition comprising an ethylinically unsaturated isocyanurate resin at least one vinyl monomer copolymerizable therewith. The isocyanurate resin is the trimerized reaction product of an ethylinically unsaturated, isocyanate functional urethane composition derived from the reaction of a polyisocyanate composition comprising a mixture of 2, 4'- and 4, 4'-diphenylmethane diisocyanates with at least one hydroxyl functionalized vinyl monomer. The polymerizable compositions are clear resins which can be reaction injection moulded to produce moulded articles having a high heat distortion temperature.

18 Claims, No Drawings

CURABLE COMPOSITIONS

CURABLE COMPOSITIONS

The present invention relates to curable compositions comprising an ethylenically unsaturated isocyanurate resin and a copolymerisable vinyl monomer and to polymer products prepared therefrom. More particularly, the present invention is concerned with such curable compositions having a viscosity which allows processing by reaction injection moulding techniques.

Ethylenically unsaturated isocyanurate compositions are known in the art. U.S. Pat. No. 4,195,146, for example, discloses unsaturated isocyanurates which are prepared by trimerising the isocyanate functional monourethane which is formed in the reaction between an aromatic polyisocyanate and a vinylidene carbonyl oxy alkanol. Both the reaction to form the monourethane and the subsequent trimerisation reaction are carried out in a solvent vehicle which is inert in the urethane forming and trimerisation reactions. Very many aromatic polyisocyanates are contemplated in this U.S. patent for the preparation of the unsaturated isocyanurate resin, but most of the examples describe unsaturated isocyanurates derived from toluene diisocyanate. However, in view of the toxicity of toluene diisocyanate, its use on an industrial scale is undesirable.

When polymethylene polyphenyl polyisocyanates or 4,4'-diphenylmethane diisocyanate are used in the preparation of the ethylenically unsaturated isocyanurate, the resulting resins tend to be unsuitable for reaction injection moulding. Specifically, when the unsaturated isocyanurate is prepared from 4,4'-diphenylmethane diisocyanate and hydroxypropyl methacrylate using a copolymerisable monomer as the solvent vehicle the resulting compositions tend to be cloudy. If polymethylene polyphenyl polyisocyanates are used to prepare the isocyanurate resin, polymerisable compositions comprising such resins tend to be unacceptably viscous.

We have now found that commercially useful polymerisable compositions comprising an ethylenically unsaturated isocyanurate resin and a vinyl monomer copolymerisable therewith are obtained by employing a particular combination of aromatic polyisocyanates for the preparation of the isocyanurate.

According to the present invention there is provided a polymerisable composition comprising a polymerisable liquid component which on curing forms a solid polymer, said polymerisable liquid comprising:

(i) an ethylenically unsaturated isocyanurate resin which is the product obtained on trimerising an ethylenically unsaturated, isocyanate functional urethane composition which comprises monourethane compounds having both an ethylenically unsaturated group and an isocyanate group, said urethane composition being the product obtained from the reaction of a reactant mixture comprising:
  (a) a proportion of a polyisocyanate composition comprising a mixture of 2,4'-diphenylmethane and 4,4'-diphenylmethane diisocyanates; and
  (b) a proportion of at least one hydroxyl functionalised vinyl monomer;

wherein the proportions of the polyisocyanate composition and the at least one hydroxyl functionalised vinyl monomer are such that the isocyanate groups are in excess over the hydroxyl groups, and (ii) at least one ethylenically unsaturated monomer which is a solvent for the ethylenically unsaturated isocyanurate resin and is copolymerisable therewith.

The ethylenically unsaturated isocyanurate resins which are comprised in the polymerisable compositions of the invention are prepared by reacting a polyisocyanate composition comprising a mixture of 2,4'- and 4,4'-diphenylmethane diisocyanates with at least one hydroxyl functionalised, i.e. containing, vinyl monomer to form an isocyanate containing urethane composition which is then trimerised whereby at least some and preferably essentially all of the isocyanate groups react to form isocyanurates. In the formation of the urethane composition, the proportions of the polyisocyanate composition and the at least one hydroxyl functionalised vinyl monomer are such that the isocyanate groups are in excess over the hydroxyl groups. Thus, the resulting urethane composition comprises, inter alia, ethylenically unsaturated monourethane compounds which carry residual isocyanate functionality for participation in the subsequent trimerisation reaction. As a result, the trimerisation of the urethane composition leads to the formation of isocyanurate compounds which comprise ethylenic unsaturation by virtue of the involvement of the isocyanate groups of the unsaturated monourethane compounds in the formation of the isocyanurate ring. It will be appreciated, of course, that the isocyanurate resins may contain residual isocyanate functionality.

The ethylenically unsaturated isocyanurate resins comprise a mixture of ethylenically unsaturated, urethane functional isocyanurates which are derived from the polyisocyanate composition defined supra and the at least one hydroxyl functionalised vinyl monomer. More particularly, the resins may be characterised as comprising a mixture of isocyanurate compounds each of which contains at least one isocyanurate ring, at least one vinyl group containing moiety and at least one urethane linkage through which the vinyl containing moiety is bonded to the isocyanurate compound, wherein the isocyanate groups for the formation of both the isocyanurate ring and the urethane linkage to the vinyl containing moiety are provided by a polyisocyanate composition comprising a mixture of 2,4'- and 4,4'-diphenylmethane diisocyanates.

It is believed that the resins comprise a mixture of unsaturated isocyanurate compounds having the formula (I):

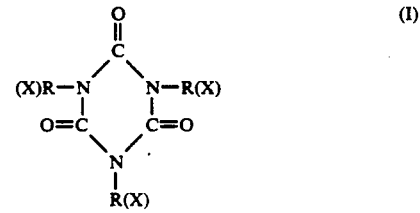

(I)

wherein
each R is independently a 2,4'-diphenyl methane or a 4,4'-diphenylmethane diradical; and
each X is independently
an isocyanurate moiety of formula (II):

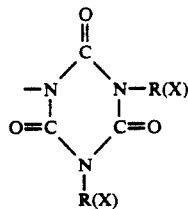

or a vinyl group containing moiety of formula (III) which is bonded to radical R via the urethane linkage,

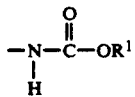

and wherein $R^1$ is a monovalent organic radical having the formula obtained by removing the hydroxyl group from the at least one hydroxyl functionalised vinyl monomer, provided that each terminal X is the vinyl group containing moiety.

The isocyanurate compounds contain at least one isocyanurate ring in the molecule and may contain a large number of such isocyanurate rings, for example up to 100. Typically, the isocyanurate resins will comprise a mixture of isocyanurate compounds containing a variable number of isocyanurate rings in the molecule.

It will be apparent to one skilled in the art that other species may and often will be present in the unsaturated isocyanurate resins. Particular mention may be made of the diurethane compounds which can be formed in the preparation of the urethane composition such as the diurethane compounds which are formed by the reaction of both the isocyanate groups in a given molecule of 2,4'-diphenylmethane or 4,4'-diphenylmethane diisocyanate with the hydroxyl groups provided by the at least one hydroxyl functionalised vinyl monomer. These diurethane compounds may be characterised by the formula (IV):

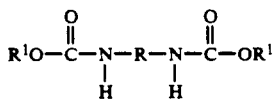

wherein

R is a 2,4'-diphenyl methane or a 4,4'-diphenylmethane diradical; and each $R^1$ is independently a monovalent organic radical having the formula obtained by removing the hydroxyl group from the at least one hydroxyl functionalised vinyl monomer.

The amount of such diurethane compounds in the unsaturated isocyanurate resin will depend, primarily, on the relative amounts of the polyisocyanate composition and the at least one hydroxyl functionalised vinyl monomer which are used in the preparation of the urethane composition. In particular, it is the ratio of isocyanate groups to hydroxyl groups provided by the reactants which will determine the amount of such diurethane compounds formed in the urethanation reaction and so the amount of such compounds in the unsaturated isocyanurate resin. Generally, the higher the proportion of hydroxyl groups to isocyanate groups the higher will be the amount of such diurethane compounds in the final isocyanurate resin. In some embodiments the diurethanes may constitute up to 70% by weight of the total weight of the isocyanurate resin. More usually, however, the isocyanurate resin will comprise from 10 to 50% by weight of such diurethane compounds.

The polyisocyanate composition from which the isocyanurate resins are prepared comprises a mixture of 2,4'and 4,4'-diphenylmethane diisocyanates. Typically, each of the diisocyanates will comprise from 10 to 90% by weight of the total weight of the polyisocyanate composition. In preferred embodiments, the polyisocyanate composition comprises from 10 to 50% by weight, preferably from 10 to 40% by weight of 2,4'-diphenylmethane diisocyanate, and from 50 to 90% by weight, preferably from 60 to 90% by weight of 4,4'-diphenylmethane diisocyanate. The polyisocyanate composition may comprise other isocyanates, for example other aromatic polyisocyanates or urethane polyisocyanates derived from the reaction of a polyol with an excess of a polyisocyanate. Where other isocyanates are incorporated in the polyisocyanate composition they will preferably provide no more than 20% and more preferably no more than 10% of the total isocyanate functionality provided by the polyisocyanate composition.

The at least one hydroxyl functionalised vinyl monomer which is used in the preparation of the ethylenically unsaturated isocyanurate resin is preferably selected from the hydroxyl functionalised partial esters of an organic polyol and acrylic or methacrylic acid. Representative examples of such partial esters include, inter alia, the hydroxy alkyl acrylates and methacrylates such as hydroxypropyl acrylate and methacrylate and hydroxyethyl acrylate and methacrylate; the monoacrylate and monomethacrylate esters of bisphenols and alkoxylated bisphenols such as ethoxylated and propoxylated bisphenols; and the hydroxyl containing polyfunctional acrylates and methacrylates such as pentaerythritol triacrylate and trimethacrylate and the diacrylates and dimethacrylates of trialkylol alkanes, e.g. the diacrylates and dimethacrylates of trimethylol propane, trimethylol ethane and trimethylol methane. Preferred hydroxyl functionalised vinyl monomers are the hydroxyalkyl acrylates and methacrylates, in particular the hydroxyalkyl acrylates and methacrylates having from 1 to 10 carbon atoms in the hydroxyalkyl group. Preferably, the at least one hydroxyl functionalised vinyl monomer is selected from the hydroxyalkyl methacrylates, with hydroxypropyl methacrylate being especially preferred as it results in the formation of particularly clear resins.

Of course, blends of any two or more hydroxyl functionalised vinyl monomers may be used in the synthesis of the ethylenically unsaturated isocyanurate resin.

As stated supra, in the preparation of the urethane composition the isocyanate groups provided by the polyisocyanate composition are in excess over the hydroxyl groups provided by the at least one hydroxyl functionalised vinyl monomer. Preferably, the amount of the polyisocyanate composition relative to the at least one hydroxyl functionalised vinyl monomer is such as to provide from 1.5 to 2.5 moles of NCO groups for every mole of OH groups, i.e. the molar excess of NCO groups per mole of hydroxyl groups is preferably in the range of from 0.5 to 1.5 moles. More preferably, the amount of the polyisocyanate composition relative to the at least one hydroxyl functionalised vinyl monomer is such as to provide from 1.8 to 2.4 moles and especially from 1.8 to 2.2 moles of NCO groups per mole of OH groups. In an especially preferred embodiment the molar ratio of NCO to OH groups is, or is about 2:1.

The urethane composition will usually comprise, inter alia, a mixture of ethylenically unsaturated, isocyanate functional monourethane compounds, diurethane compounds and unreacted polyisocyanate. The isocyanate functionality present in the urethane composition, including that provided by the monourethane compounds and the unreacted polyisocyanate, is available for isocyanurate ring formation in the subsequent trimerisation reaction.

While it is essential in the present invention that a hydroxyl functionalised vinyl monomer is used in the preparation of the unsaturated isocyanurate resin, it is contemplated by the present invention that a certain proportion of such vinyl monomer may be replaced by one or more saturated isocyanate reactive compounds. Such compounds include the monohydric alcohols and phenols, the polyols such as aromatic and aliphatic polyols and the amine functional compounds carrying a primary or secondary amino group.

Illustrative examples of monohydric alcohols which may be used as replacement for a proportion of the at least one hydroxyl functionalised vinyl monomer include, inter alia, methanol, ethanol, propanol, butanol, octyl alcohol, cyclohexanol and benzyl alcohol, and the halogenated alcohols such as 2-bromoethanol, 3-bromo-1-propanol and 1-bromo-2-propanol.

Illustrative examples of polyols which may be used to replace a proportion of the at least one hydroxyl functionalised vinyl monomer include glycols of formula HO—Z—OH, where Z represents, for example, an alkylene or polyalkylene ether chain, e.g. ethylene glycol, propylene glycol, butan-1,4-diol, pentan-1,5-diol, hexan-1,6-diol, diethylene glycol, dipropylene glycol, polyethylene glycol, polypropylene glycol, polybutylene glycol and polytetrahydrofuran; dihydric phenols and bisphenols, for example, 2,2-bis(4-hydroxyphenyl) propane (Bisphenol A) and bis(4-hydroxyphenyl) sulphone (Bisphenol S), and oxyalkylated derivatives of the bisphenols, for example the ethoxylated and propoxylated derivatives thereof.

Further suitable polyols include the triols such as glycerol, pentaerythritol, and trialkylolalkanes, for example trimethylolpropane, triethylolpropane and tributylolpropane, and alkoxylated derivatives of the trialkylolalkanes, for example the ethoxylated and propoxylated derivatives thereof.

Particular mention may be made of the polyalkylene ether polyols such as polyethylene glycol, polypropylene glycol, polybutylene glycol and polytetrahydrofuran which may be usefully employed to replace a proportion of the hydroxyl functionalised vinyl monomer as a means to improve the toughness and reduce the brittleness of the polymeric products prepared from the polymerisable compositions of the present invention.

Where saturated isocyanate reactive compounds are used in the formation of the isocyanurate resin, in addition to the essential at least one hydroxyl functionalised vinyl monomer, they will be added prior to the trimerisation reaction and will thus form a part of the reactants used to form the ethylenically unsaturated, isocyanate functional urethane composition. The hydroxyl groups of the at least one hydroxyl functionalised vinyl monomer should provide at least 50% and preferably at least 75% of the total number of isocyanate reactive groups available for reaction with the polyisocyanate composition. Furthermore, the additional isocyanate reactive compounds are used as a replacement for a proportion of the at least one hydroxyl functionalised vinyl monomer, so that the isocyanate groups are still in excess over the isocyanate reactive groups in the reactants used to form the urethane composition. In particular, the excess of isocyanate to isocyanate reactive groups should be as stated above in connection with embodiments where the isocyanate reactive groups are provided exclusively by the at least one hydroxyl functionalised vinyl monomer; that is to say the polyisocyanate composition will preferably provide from 1.5 to 2.5 moles of NCO groups for every mole of isocyanate reactive groups.

The polymerisable compositions of the invention also comprise at least one ethylenically unsaturated monomer which is a solvent for, and is copolymerisable with the unsaturated isocyanurate resin. The at least one ethylenically unsaturated monomer may be selected from any of the addition polymerisable monomers known in the art including those monomers comprising one or more vinylic, vinylidic, allylic, acrylic or methacrylic double bonds.

Suitable ethylenically unsaturated monomers may be selected from, inter alia, the acrylic type monomers such as acrylic, methacrylic and chloroacrylic acids (i.e. $CH_2=CHClCO.OH$), acrylamide and methacrylamide, alkoxyalkyl acrylamides and methacrylamides, e.g. butoxymethyl acrylamide and methoxymethyl methacrylamide, hydroxyalkyl acrylamides and methacrylamides, e.g. N-methylol methacrylamide and N-methylol acrylamide, the metal acrylates and methacrylates, and the esters of acrylic, methacrylic and chloroacrylic acids with alcohols and phenols; the vinyl aromatic compounds, e.g. styrene and substituted derivatives thereof such as the halogenated derivatives thereof and vinyl toluene; the vinyl esters, e.g. vinyl acetate, and vinyl pyrrolidone. Further suitable examples of ethylenically unsaturated monomers which may be employed in the polymerisable compositions of the invention are the polyethylenically unsaturated monomers of the type that are known in the art, in particular the polyethylenically unsaturated monomers having two or more acrylic or methacrylic double bonds such as ethylene glycol dimethacrylate, ethylene glycol diacrylate, 1,3-butylene glycol dimethacrylate, 1,3-butylene glycol diacrylate, triethylene glycol dimethacrylate, triethylene glycol diacrylate, trimethylolpropane trimethacrylate and trimethylolpropane triacrylate.

Preferred copolymerisable monomers are the esters of acrylic and methacrylic acids with aliphatic and alicyclic alcohols and phenols. Representative examples of such monomers are the non-functionalised esters of acrylic and methacrylic acids such as methyl methacrylate, ethyl methacrylate, isopropyl methacrylate, isobutyl methacrylate, cyclohexyl methacrylate, isobornyl methacrylate, benzyl methacrylate, phenyl methacrylate and isobornyl acrylate. Further suitable (meth)acrylic acid ester monomers may be selected from the functionalised esters of acrylic and methacrylic acids such as hydroxyethyl methacrylate and hydroxypropyl methacrylate. Particularly preferred monomers are selected from the alkyl esters of acrylic and methacrylic acids, in particular the alkyl esters of methacrylic acid and especially the alkyl esters of methacrylic acid having from 1 to 8 carbon atoms in the alkyl group. Methyl methacrylate is an especially preferred monomer on account of the high stability of a polymerisable composition comprising such monomer.

The polymerisable liquid may comprise a single copolymerisable monomer or a mixture of two or more such monomers, for example a mixture comprising one or monomers selected from the monomers described above as preferred, particularly preferred and especially preferred and one or more other copolymerisable monomers.

The polymerisable liquid preferably comprises from 10 to 90% by weight, more preferably from 25 to 75% by weight, and particularly preferably from 40 to 60% by weight of the unsaturated isocyanurate resin, and from 90 to 10% by weight, more preferably from 75 to 25% by weight, and particularly preferably from 60 to 40% by weight of the at least one ethylenically unsaturated monomer.

The at least one copolymerisable monomer may be simply added to the unsaturated isocyanurate resin in order to form the polymerisable compositions of the invention. However, if the copolymerisable monomer is of a type which is inert in the conditions used to form the isocyanurate resin, it is most desirable to utilise such as a liquid vehicle in which the isocyanurate resin is formed. Where it is desired to include in the polymerisable composition a monomer(s) which contains a functional group(s) which will participate in the reactions used to form the isocyanurate resin, such monomer must be added after the formation of the isocyanurate resin is complete.

A preferred polymerisable liquid is one which polymerises/cures to form a solid polymer matrix having a glass transition temperature of at least 60° C., preferably at least 80° C. and more preferably at least 100° C., e.g. 100° to 180° C.

The ethylenically unsaturated isocyanurate resins are prepared in a process which comprises first forming an ethylenically unsaturated, isocyanate functional urethane composition and then trimerising the urethane composition so that a least some and preferably essentially all of the isocyanate groups react to form isocyanurates.

The urethane composition may be prepared using techniques conventional in the art for the preparation of urethanes. The preparation is preferably carried out in the presence of a liquid diluent which does not contain any functional groups which would react in, or in any way interfere with the urethane forming reaction. Moreover, since the thus prepared urethane composition will ordinarily be used directly in the isocyanurate forming reaction, the liquid diluent should not interfere with the isocyanurate forming reaction. A wide range of satisfactory diluents are available such as the hydrocarbon diluents, e.g. toluene. However, if a copolymerisable monomer which does not interfere with the urethane forming or isocyanurate forming reactions is to be included in the final polymerisable composition, it is particularly convenient, in order to avoid the need for separation of the unsaturated isocyanurate resin, to employ such monomer as a liquid diluent. Illustrative examples of copolymerisable monomers which are also useful as a liquid diluent include the alkyl methacrylates, e.g. methyl methacrylate and vinyl aromatics, e.g. styrene. In the formation of the urethane composition the temperatures are conveniently maintained in the range of from 40° to 95° C.

Catalysts which may be used in the reaction of the urethane precursors may be those known in the art of polyurethane production, for example tertiary amines and metal salts, e.g. tin (II) octoate and di-n-butyltin dilaurate.

To form the isocyanurate resin, the isocyanate containing urethane composition is trimerised in the presence of an isocyanate trimerisation catalyst. The urethane composition may be trimerised by any procedure conventional in the art for trimerising isocyanates. In a preferred method, the trimerisation of the urethane composition is carried out in a non-reactive liquid diluent and is conducted at temperatures which are maintained in the range of from 0° to 95° C., preferably in the range of from 20° to 90° C. and especially in the range of from 20° to 70° C. Conveniently, the inert liquid diluent is the diluent used in the preparation of the urethane composition and in particularly preferred embodiments, the inert liquid diluent is a copolymerisable monomer which after formation of the isocyanurate resin constitutes a part of the polymerisable composition.

The trimerisation catalyst may be any trimerisation catalyst known in the art for trimerising isocyanates. Suitable trimerisation catalysts include benzyltrimethylammonium hydroxide, N,N-dimethyl aniline, N-methyl morpholine, triethylene tetraamine and tributyl phosphine. A preferred trimerisation catalyst is benzyltrimethylammonium hydroxide. The active trimerisation catalyst is conveniently employed in an amount ranging from 0.04% to about 1.0% by weight based on the total weight of the urethane composition.

Where a non-reactive monomer is used as a liquid diluent it may be desirable to add a polymerisation inhibitor to the reaction system in order to prevent or at least minimise unwanted polymerisation. If the monomer already contains a polymerisation inhibitor, as is common in the monomers sold in commerce, the addition of further inhibitor may be unnecessary.

Where it is desired to include in the polymerisable composition an ethylenically unsaturated monomer which contains a functional group which would interfere with the reactions employed to prepare the unsaturated isocyanurate resin, such monomer is added after the formation of the unsaturated isocyanurate resin is complete.

The viscosity of the polymerisable liquid may be varied over a wide range by exercising control over the proportions of the polyisocyanate composition and the isocyanate reactive compounds which are used in the synthesis of the isocyanurate. Thus, by varying the excess of isocyanate groups to isocyanate reactive groups in the reaction used to form the urethane composition it is possible to exercise control over the molecular weight of the isocyanurate resin and so the viscosity of the polymerisable liquid comprising it. Increasing the excess of isocyanate groups over the isocyanate reactive groups favours the formation of higher molecular weight isocyanurate resins owing to the increased amount of isocyanate groups in the urethane composition which are able to participate in the subsequent trimerisation reaction. Conversely, lowering the excess of isocyanate groups over the isocyanate reactive groups favours the formation of lower molecular weight isocyanurate resins. For a polymerisable liquid comprising a given amount of the isocyanurate resin and the at least one copolymerisable monomer, higher molecular weight isocyanurate resins lead to higher viscosity polymerisable liquids.

The viscosity of the polymerisable liquid can be further controlled by varying the proportions of the isocyanurate resin and the at least one copolymerisable monomer it contains. The higher the concentration of the isocyanurate resin the higher will be the viscosity of the polymerisable liquid.

Thus, it is within the purview of the man skilled in the art to prepare a polymerisable liquid having the desired viscosity. The preferred polymerisable liquids of the invention have a viscosity in the range of from 50 to 500 centipoise, preferably in the range of from 50 to 400 centipoise and especially in the range of from 100 to 300 centipoise, as measured at 20° C. on a Brookfield viscometer using spindle number 3 at 30 rpm.

The polymerisable compositions of the invention may comprise one or more preformed polymers which may be in solution in the polymerisable liquid component or in state of dispersion therein. Preformed polymers which function as low profile additives to reduce the shrinkage which accompanies the curing reaction, or which function as rubber modifiers to improve the impact resistance of the finally cured composites may be particularly useful additions to the polymerisable compositions of the invention. Where low profiling and/or impact modifying preformed polymers are incorporated in the polymerisable compositions of the invention they may be added in amounts which are conventional in the art. Preformed polymers may also be incorporated in the polymerisable compositions as a thickening aid to increase the viscosity thereof.

The preformed polymer may be dispersed or dissolved in the polymerisable liquid component using vigorous mixing, e.g. as is provided by a high shear mixer. A further suitable technique involves mixing the preformed polymer in a liquid component of the polymerisable liquid, e.g. in a portion of the copolymerisable monomer, and then adding the resulting monomer/preformed polymer dispersion or solution, with mixing, to the remaining components of the polymerisable liquid.

The polymerisable compositions of the invention may also comprise other ethylenically unsaturated resins such as ethylenically unsaturated polyester resins. The reactive ethylenic unsaturation contained in such polyester resins is capable of reacting with the unsaturation contained in the isocyanurate resin and the at least one copolymerisable monomer.

The polymerisable compositions of the invention may comprise a finely divided inorganic filler material. Any inorganic filler may, in reason, be used in the present invention provided that the filler is stable in the polymerisable liquid and the matrix polymer prepared therefrom, and under any processing conditions which are employed in the preparation of the filled, polymerisable composition or the curing thereof. Preferably, the inorganic filler is capable of interacting, e.g. by bonding, with a coupling agent (described hereinafter) so as to provide strong polymer matrix/particle filler bonding.

Suitable fillers may include amphoteric, basic and silicaceous fillers, and may be of natural or synthetic origin. The filler, if amphoteric, may, for example, be an oxide of this type. Suitable such fillers include oxides and hydroxides of aluminium, including hydrated alumina. The filler, if basic, may, for example, be an oxide, a hydroxide, a carbonate or a basic carbonate. Suitable fillers of this type include, inter alia, the oxides, hydroxides, carbonates and basic carbonates of alkaline earth metals and of zinc. Suitable silicaceous fillers include, inter alia, substantially pure silica, for example sand, quartz, cristobalite and precipitated or fused silica, or the metal silicates or aluminosilicates. Further useful fillers may be selected from the metal aluminates, phosphates, sulphates, sulphides and carbides.

Preferably, the finely divided fillers for use in the invention have a mean particle size of less than 100 microns. In talking about the size of the particles we are referring to the size thereof across their largest dimension. The filler particles for use in the invention may have any form suitable for a filler, e.g. they may be of granular, fibrillar or laminar form.

In order to attain high filler loadings the filler may also consist of two or more sets of particles having widely differing mean sizes such that one set of particles can fit in the interstices of the other within the polymer matrix.

The polymerisable compositions may contain from 20% to 90% by volume of a finely divided filler material. Preferably, the proportion of the filler (if included) is from 35% to 75% by volume, more preferably from 40% to 70% by volume, of the total volume of the polymerisable composition.

Where the filler is already available in the required particle size, the filler particles can be dispersed in the polymerisable liquid using techniques such as roll milling or high shear mixing. A further suitable mixing technique involves dispersing the filler in a liquid component of the polymerisable liquid, e.g. in a portion of the copolymerisable monomer component, and then mixing the resultant dispersion with the remaining components of the liquid. Alternatively, the finely divided particles may be produced directly in the presence of the polymerisable liquid, or in a liquid component thereof, by comminution of coarse particles. Comminution of coarse material to yield smaller size particles can be readily carried out using conventional ball mills, stirred ball mills or vibratory mills.

The polymerisable compositions of the invention may also comprise a course filler material, e.g. a filler material the particles of which have a mean size across their largest dimension of greater than 200 microns, e.g. greater then 500 microns.

When the polymerisable compositions of the invention comprise a finely divided inorganic filler they may comprise a polymeric dispersant to assist the dispersion of the filler in the polymerisable liquid. Furthermore, the filled polymerisable compositions of the invention may comprise a coupling agent having active groupings to promote polymer matrix/filler particle bonding. Suitable coupling agents comprise one or more groups capable of interacting with groups in the particulate inorganic filler, and also one or more ethylenically unsaturated, addition polymerisable groups which can copolymerise with the constituents of the polymerisable liquid. A suitable coupling agent when silicaceous fillers are employed is—methacryloxypropyl trimethoxysilane.

The selection of a suitable dispersant and coupling agent is within the purview of the man skilled in the art.

The polymerisable compositions of the invention may also incorporate other additives conventional in the art such as pigments, dyestuffs, internal mould release agents and polymerisation inhibitors.

The polymerisable compositions of the invention may be cured in accordance with techniques conventional in the art of free radical addition polymerisation. The polymer products prepared on curing the polymerisable compositions of the invention possess a good balance of mechanical properties and in particular tend to have a high heat distortion temperature.

The polymerisation can be initiated by a wide range of free radical generating catalysts. The catalyst is preferably added immediately prior to curing the polymerisable compositions, this is particularly important where the catalyst is activated at temperatures below or around ambient. The catalyst is conveniently used in an amount ranging from 0.1% to 3.5% by weight based on the total weight of the polymerisable liquid. Suitable catalysts are well known to those skilled in the art and may include, for example, organic peroxides, such as dioctanoyl peroxide and dibenzoyl peroxide which may be used in conjunction with an amine accelerator, e.g. N,N-dimethylaniline or N,N-dimethyl-para-toluidine; the hydroperoxides, such as t-butyl hydroperoxide; the peroxydicarbonates, such as diisopropyl-peroxydicarbonate, and the peresters. A particularly suitable catalyst is dibenzoyl peroxide with N,N-dimethylaniline or N,N-dimethyl-para-toluidine accelerator. The dibenzoyl peroxide and amine accelerator may be added to separate portions of the polymerisable composition which are then combined prior to the curing process.

The polymerisable compositions of the invention are usefully employed in the manufacture of moulded articles by curing the compositions in-mould (in-mould polymerisation).

A particularly desirable technique for manufacturing moulded articles is reaction injection moulding. This is a technique known in the art and basically involves injecting the reactive polymerisable composition into a closed mould where it cures to yield the moulded article. Where heat activated polymerisation catalysts are employed the mould may be heated to activate the catalyst and initiate the co-reaction of the components of the polymerisable liquid.

Reaction injection moulding requires the use of a relatively fluid polymerisable composition, which typically means that the viscosity of the polymerisable composition is less than 1000 centipoise. It is possible in accordance with the present invention to prepare polymerisable liquids which have a viscosity which is well within the workable viscosity range for reaction injection moulding. Moreover, the ability to prepare low viscosity polymerisable liquids enables highly filled polymerisable compositions incorporating such liquids to be prepared which have a viscosity which is workable in a reaction injection moulding process.

It may be desirable during the filling of the mould to maintain the temperature of the mould surfaces below the temperature at which the catalyst is activated, so as to prevent premature polymerisation and gelation.

Prior to moulding, the internal mould surfaces may be coated with a release agent to prevent adhesion of the cured materials to the mould and to obtain a good surface finish. These techniques are well known in the art. Examples of suitable external mould release agents include, inter alia, polytetrafluoroethylene, silicone and polyvinylalcohol.

A particularly desirable use for the polymerisable compositions of the invention is for the production of fibre reinforced composites, especially glass-fibre reinforced composites, by automated processes.

In an example of such a process, the fibrous reinforcement (which may be chopped strand mat, continuous filament mat, woven continuous filament mat or any other variation of mat) is placed in the open mould, the mould is closed and the polymerisable composition fed to the mould, either by applying a vacuum to the closed mould cavity to draw the composition into the mould or by pumping the resin through, or by a combination of vacuum assisted pumping. Alternatively, the fibrous reinforcement and the polymerisable composition may be placed in the open mould and the act of mould closure itself causes the resin to flow through the fibres. The low viscosity polymerisable compositions which are preparable in accordance with present invention are able to flow through and wet-out the fibres to produce an integrated fibre reinforced composite.

Other known techniques for preparing fibre reinforced polymer composites may be readily applied to the preparation of such composites from the polymerisable compositions of the invention.

The present invention is now illustrated, but not limited, by the following example.

Preparation of a polymerisable composition comprising an isocyanurate resin and methyl methacrylate monomer:

A polyisocyanate composition comprising 80% by weight of 4,4'-diphenylmethane diisocyanate and 20% by weight of 2,4'-diphenylmethane diisocyanate (250 g), methyl methacrylate (393.4 g - stabilised with 60 ppm of hydroquinone), di-n-butyltin dilaurate (2.5 g), 4-methyl-2.6-di-t-butylphenol (0.08 g), benzoquinone (0.024 g) and hydroquinone (0.024 g) were charged to a round bottomed flask provided with a stirrer, condenser, air bleed, dropping funnel and thermocouple. The mixture was stirred at ambient temperature and the reaction vessel was purged with air from the air bleed. Hydroxypropyl methacrylate (158.6 g) was added to the stirred mixture from the dropping funnel at a rate of 5 ml/minute. The heat of reaction raised the temperature of the reaction mixture to 68° C. and with the application of heat the reaction mixture was maintained at this temperature for 60 minutes with constant stirring.

The mixture was then allowed to cool to below 50° C. and 1.2 g of N-benzyltrimethyln-monium hydroxide as a 40% solution in methanol were added. An exothermic trimerisation reaction ensued and with the aid of external cooling the reaction mixture was kept below 70° C. The reaction mixture was stirred for a further 2 hours at which point 0.4 g of methanesulphonic acid were added to neutralise any excess of the trimerisation catalyst. The final product was a clear solution of the isocyanurate resin in methyl methacrylate. The product had a viscosity, as measured at 20° C. on a Brookfield viscometer using spindle number 3 at 30 rpm, of 200 to 210 centipoise and contained 0.1% by weight of residual isocyanate groups.

Polymer preparation

The polymerisable composition prepared above was used to make a polymer plaque.

The composition was divided into two portions. A polymerisation catalyst (dioctanoyl peroxide, 1.2% by weight on the weight of the composition) was thoroughly mixed into one of the portions and an accelerator (N,N-dimethyl-p-toluidine, 0.4% by weight on the weight of the composition) was thoroughly mixed into the other.

The two portions were thoroughly mixed together and the resulting mixture was degassed under vacuum and then filled into a mould constructed from two glass plates separated by a PVC gasket. The glass plates had been previously cleaned and treated with an external mould release agent to assist the removal of the polymer plaque from the mould. Curing was effected at room temperature and was essentially complete after 20 minutes. The plaque was then demoulded and post-cured between clean glass plates at a temperature of 115° C. for 40 hours. The finished plaque was cut into test specimens and its mechanical properties determined. The mechanical properties of the polymer plaque produced are shown below.

Tensile failure strength—70.5 MPa
Tensile modulus—3.1 GPa
Tensile failure strain—3.6%
Glass transition temperature (tan δ max)—172° C.
Heat distortion temperature—145° C.

What is claimed is:

1. A polymerisable composition comprising a polymerisable liquid component which on curing forms a solid polymer, said polymerisable liquid comprising:
   (i) an ethylenically unsaturated isocyanurate resin which is the product obtained on trimerising an ethylenically unsaturated, isocyanate functional urethane composition which comprises monourethane compounds having both an ethylenically unsaturated group and an isocyanate group, said urethane composition being the product obtained from the reaction of a reactant mixture comprising:
      (a) a proportion of a polyisocyanate composition comprising a mixture of 2,4'-diphenylmethane and 4,4'-diphenylmethane diisocyanates; and
      (b) a proportion of at least one hydroxyl functionalised vinyl monomer;
      wherein the proportions of the polyisocyanate composition and the at least one hydroxyl functionalised vinyl monomer are such that the number of isocyanate groups are in excess over the number of hydroxyl groups, and
   (ii) at least one ethylenically unsaturated monomer which is a solvent for the ethylenically unsaturated isocyanurate resin and is copolymerisable therewith.

2. A polymerisable composition as claimed in claim 1 wherein the resin comprises a mixture of unsaturated isocyanurate compounds having the formula (I):

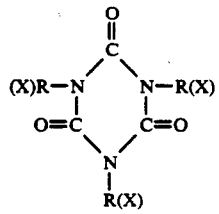

(I)

wherein
each R is independently a 2,4'-diphenyl methane or a 4,4'-diphenylmethane diradical; and
each X is independently
an isocyanurate moiety of formula (II):

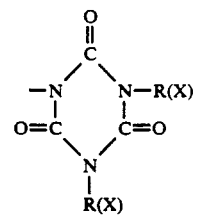

(II)

or
a vinyl group containing moiety of formula (III) which is bonded to radical R via the urethane linkage,

(III)

and wherein $R^1$ is a monovalent organic radical having the formula obtained by removing the hydroxyl group from the at least one hydroxyl functionalised vinyl monomer, provided that each terminal X is the vinyl group containing moiety.

3. A polymerisable composition as claimed in claim 1 wherein the resin contains at least one diurethane compound of a formula (IV):

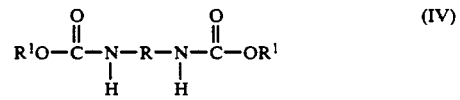

(IV)

wherein
R is a 2,4'-diphenyl methane or a 4,4'-diphenylmethane diradical; and
each $R^1$ is independently a monovalent organic radical having the formula obtained by removing the hydroxyl group from the at least one hydroxyl functionalised vinyl monomer.

4. A polymerisable composition as claimed in claim 3 wherein the diurethane compound constitutes up to 70% by weight of the total weight of the resin.

5. A polymerisable composition as claimed in claim 1 wherein the diisocyanates comprise from 10 to 90% by weight of the total weight of the polyisocyanate composition.

6. A polymerisable composition as claimed in claim 5 wherein the polyisocyanate composition contains from 10 to 50% by weight of 2,4'- diphenylmethane diisocyanate and 50 to 90% by weight of 4,4'-diphenylmethane diisocyanate.

7. A polymerisable composition as claimed in claim 1 wherein the at least one hydroxyl functionalised vinyl monomer is selected from hydroxyl functionalised partial esters of an organic polyol and acrylic and/or methacrylic acid.

8. A polymerisable composition as claimed in claim 7 wherein the partial ester comprises an hydroxy alkyl acrylate and/or an hydroxy alkyl methacrylate.

9. A polymerisable composition as claimed in claim 1 wherein the amount of the polyisocyanate composition relative to the amount of the at least one hydroxyl functionalised vinyl monomer is such as to provide 1.5 to 2.5 moles of isocyanate groups for every mole of hydroxyl groups.

10. A polymerisable composition as claimed in claim 1 wherein the at least one ethylenically unsaturated monomer is an addition polymerisable monomer.

11. A polymerisable composition as claimed in claim 10 wherein the ethylenically unsaturated monomer comprises at least one bond selected from the group consisting of vinylic, vinylidic, allylic, acrylic, and methacrylic.

12. A polymeric composition as claimed in claim 1 wherein the resin comprises from 10 to 90% by weight of the polymerisable liquid and from 10 to 90% by weight of the at least one ethylenically unsaturated monomer.

13. A polymerisable composition as claimed in claim 1 wherein the polymerisable liquid cures to form a solid polymer matrix having a glass transition temperature of at least 60° C.

14. A polymerisable composition as claimed in claim 1 comprising 20 to 90% by volume of a finely divided filler material.

15. A moulded article prepared from a polymerisable composition as defined claim 1.

16. A moulded article as claimed in claim 15 comprising fibrous reinforcement.

17. A polymerisable composition comprising a polymerisable liquid component which on curing forms a solid polymer, said polymerisable liquid comprising:
  (i) an ethylenically unsaturated isocyanurate resin which is the product obtained on trimerising an ethylenically unsaturated, isocyariate functional urethane composition which comprises monourethane compounds having both an ethylenically unsaturated group and an isocyanate group, said urethane composition being the product obtained from the reaction of a reactant mixture comprising:
    (a) a proportion of a polyisocyanate composition comprising a mixture of 2,4'-diphenylmethane and 4,4'-diphenylmethane diisocyanates; and
    (b) a proportion of hydroxypropyl methacrylate;
  wherein the proportions of the polyisocyanaty composition and hydroxypropyl methacrylate are such that the number of isocyanate groups are in excess over the number of hydroxyl groups, and
  (ii) methyl methacrylate, which is a solvent for the ethylenically unsaturated isocyanurate resin and is copolymerisable therewith.

18. A moulded article prepared from the polymerisable composition as defined in claim 17.

* * * * *